United States Patent [19]

Katata

[11] 4,213,578
[45] Jul. 22, 1980

[54] CASSETTE TAPE REEL
[75] Inventor: Tetsuo Katata, Kawaguchi, Japan
[73] Assignee: Dai-Ichi Seiko Co., Ltd., Kawaguchi, Japan
[21] Appl. No.: 974,500
[22] Filed: Dec. 29, 1978
[30] Foreign Application Priority Data Feb. 24, 1978 [JP] Japan .................................. 53-20500

[51] Int. Cl.² ........................................... B65H 75/28
[52] U.S. Cl. ..................................................... 242/74
[58] Field of Search ....................... 242/74, 74.1, 74.2, 242/71.8

[56] References Cited

U.S. PATENT DOCUMENTS

| 3,523,654 | 8/1970 | Zielke | 242/74.1 |
| 3,544,028 | 12/1970 | Wangerin | 242/74.1 |
| 3,661,345 | 5/1972 | Ritz, Jr. et al. | 242/74.1 |
| 3,921,927 | 11/1975 | Esashi et al. | 242/74 |
| 3,960,338 | 6/1976 | Shapley | 242/74.1 |
| 4,121,784 | 10/1978 | Schwartz et al. | 242/74 |

FOREIGN PATENT DOCUMENTS

| 288020 | 5/1914 | Fed. Rep. of Germany | 242/74.1 |
| 2364677 | 10/1974 | Fed. Rep. of Germany | 242/74 |
| 383307 | 12/1964 | Switzerland | 242/74 |

*Primary Examiner*—George F. Mautz
*Attorney, Agent, or Firm*—Cushman, Darby & Cushman

[57] ABSTRACT

A cassette tape reel comprising a hub having a cut portion which is narrow at the entrance portion and wide at the inner portion and a tape locking piece having an elliptic section, the cassette tape reel being arranged to fasten the tape by placing the tape in the cut portion of the hub and, then, inserting the tape locking piece to the cut portion and turning it therein, the cassete tape reel being arranged so that the tape is fastened more strongly when a force is applied to the tape.

9 Claims, 10 Drawing Figures

FIG. 1 PRIOR ART
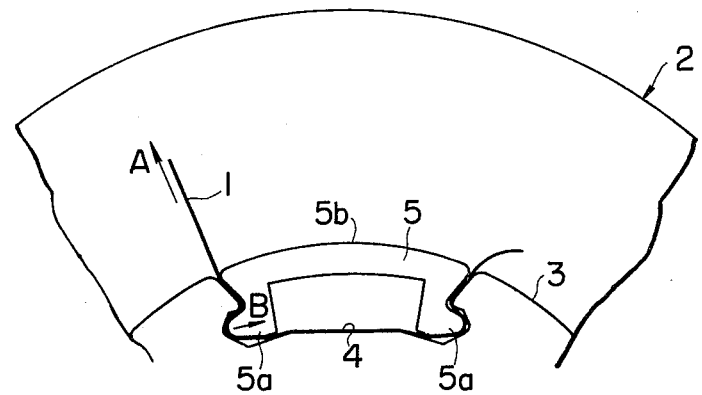
FIG. 2 PRIOR ART
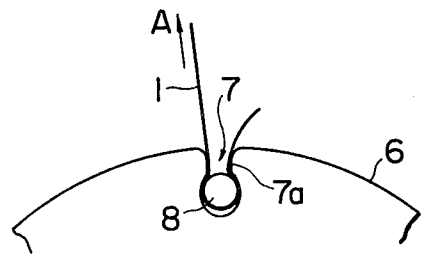
FIG. 3A PRIOR ART
FIG. 3B PRIOR ART
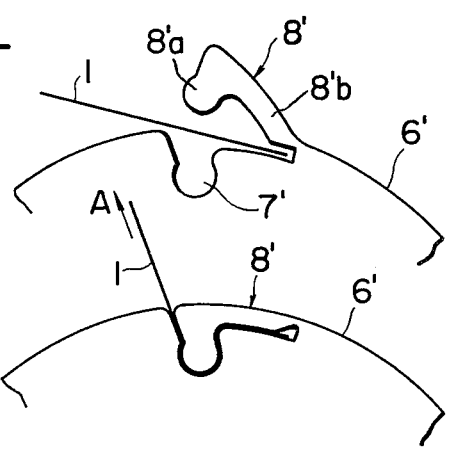

CASSETTE TAPE REEL

BACKGROUND OF THE INVENTION (a) Field of the invention

The present invention relates to a cassette tape reel for video cassette tapes and the like and, more particularly, to a cassette tape reel which is characterized by its tape locking means.

(b) Description of the prior art

Known tape reels for video cassette tapes have locking means for fastening the tape to the reel as described below. As shown in FIG. 1, a cut portion 4 having the shape shown in the figure is formed in a hub 3 of tape reel 2. An end of tape 1 is put into the cut portion 4 and, then, a tape locking piece 5 is pushed into the cut portion 4 so that the tape 1 is fastened to the hub 3. In case of the above-mentioned tape locking means of known tape reel, a force in the direction shown by an arrowhead B in FIG. 1 is applied to a tape locking portion 5a of the tape locking piece 5 when the tape 1 is pulled in the direction shown by the arrowhead A. Because of the above-mentioned force, the tape locking piece 5 flexes and the tape locking portion 5a moves toward the direction shown by the arrowhead B. As a result, the tape locking piece 5 easily comes off from the cut portion 4. Moreover, in case of the above-mentioned tape locking means, the tape locking piece 5 is slightly deflected and the tape is fastened by the reaction caused by deflection. Therefore, it is difficult to make the curvature of circumferential surface 5b of tape locking piece 5 equal to the curvature of circumferential surface of hub 3 when the tape locking piece 5 is pushed into the cut portion 4.

FIG. 2 shows a known tape locking means chiefly used for hubs of audiotape cassettes in which a cut portion 7 is formed in a hub 6 and a locking pin 8 is pushed into the cut portion 7 to fasten the tape. In case of this tape locking means, tension in the direction shown by the arrowhead A occurs when the fastened tape is pulled and, as a result, the locking pin 8 will come off from the cut portion 7. This disadvantage can be eliminated when the entrance portion 7a of cut portion 7 is made narrow. When, however, the entrance portion 7a is made narrow, an extremely strong force will be required when the locking pin 8 is pushed into the cut portion 7. As a result, a flaw will be caused to the tape when fastening it and the tape will tend to break easily.

FIG. 3 shows another example of known tape locking means. This tape locking means is arranged to fasten the tape by using a tape locking piece 8' which is so constructed that a tape locking member 8'a corresponding to the locking pin 8 shown in FIG. 2 is connected to a hub 6' by a connecting member 8'b. That is, the tape is fastened by pushing the tape locking member 8'a of tape locking piece 8' into the cut portion 7'. This tape locking means also has the disadvantage, in the same way as the tape locking means shown in FIG. 2, that the tape locking piece easily comes off when the tape is pulled.

SUMMARY OF THE INVENTION

It is, therefore, a primary object of the present invention to provide a cassette tape reel comprising a hub having a cut portion, of which the width at the entrance portion is comparatively small and the width at the inner portion is comparatively large, and a tape locking piece having at least one tape locking member, of which the width is smaller than the width of the entrance portion of the cut portion and the length is comparatively large, said cassette tape reel being thereby arranged so that the tape locking member can be easily inserted to the cut portion, said cassette tape reel being further arranged to fasten the tape by turning the tape locking member, after inserting the tape locking member to the cut portion, toward the direction to which the tape is to be pulled so that the tape is fastened more strongly and does not come off from the hub when a pulling force is applied to the tape.

BRIEF DESCRIPTION OF THE DRAWINGS

FIGS. 1, 2, 3A and 3B respectively shown plan views illustrating parts of known cassette tape reels;

DETAILED DESCRIPTION OF THE PREFERRED EMBODIMENTS

Figure 4A:
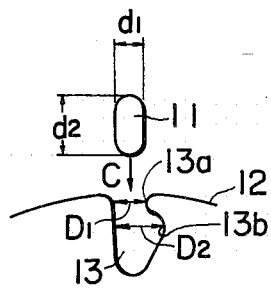
FIGS. 4A and 4B respectively shown plane views illustrating Embodiment 1 of the present invention.
Figure 4B:
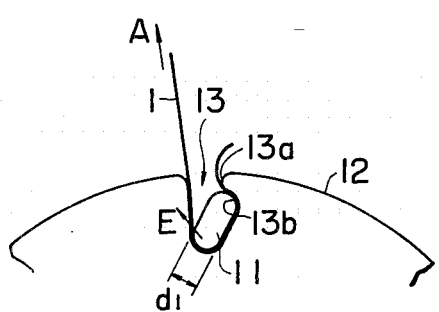

For easier understanding of theory of the present invention, the cassette tape reel according to the present invention is at first described based on Embodiment 1 shown in FIGS. 4A and 4B which corresponds to the known tape locking means shown in FIG. 2 which is chiefly used for audiotape cassettes. In FIGS. 4A and 4B, numeral 11 designates a tape locking piece which is formed like a pin having a substantially elliptic section. Numeral 12 designates a hub having a cut portion 13 of the shape as shown in FIGS. 4A and 4B. As shown in FIG. 4A, the cut portion 13 is formed so that its width $D_1$ at the entrance portion 13a is equal to or larger than the width $d_1$ of tape locking piece 11 while its width $D_2$ at the inner portion 13b is larger than the width $D_1$ at the entrance portion but smaller than the length $d_2$ of tape locking piece 11. To fasten the tape to the hub 12 which has the cut portion 13 with the above-mentioned shape, the tape is inserted to the cut portion 13 and, then, the tape locking piece 11 is inserted to the cut portion 13 in the direction shown by the arrowhead C in FIG. 4A, i.e., by putting the tape locking piece 11 in the position that its width direction coincides with the direction of width $D_1$ at the entrance portion 13a of cut portion 13. After inserting the tape locking piece 11 as above, it is turned clockwise in FIG. 4A by using a suitable tool. Thus, the tape 1 is pushed by the side surface of tape locking piece 11 against the wall surface in the cut portion 13 of hub and is fastened as shown in FIG. 4B. As described in the above, when the tape reel according to the present invention is used, it is possible to easily insert the tape locking piece into the cut portion without applying a strong force and to easily fasten the tape only by turning the tape locking piece after inserting it. When tension is applied to the tape 1 after fastening it, the tape locking piece 11 is liable to turn because its one end is pulled by the tape. At that time, however, the tape locking piece 11 is further pushed against the wall surface in the cut portion 13 and, consequently, the tape is fastened more firmly and never comes off.

Figure 5A:
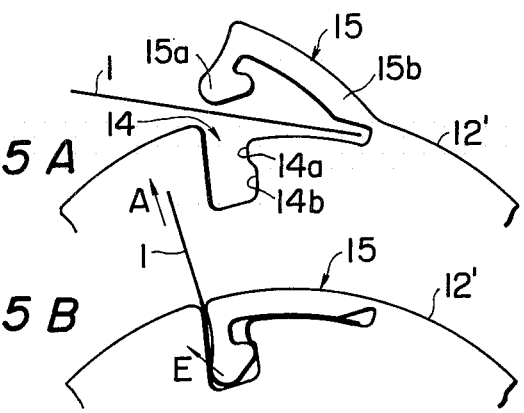
FIGS. 5A and 5B respectively shown plan views illustrating Embodiment 2 of the present invention.
Figure 5B:

FIGS. 5A and 5B show Embodiment 2 of the cassette tape reel according to the present invention. FIG. 5A shows the state before fastening the tape and FIG. 5B shows the state after fastening the tape. Embodiment 2 comprises a tape locking piece 15 formed by integrally connecting a tape locking member 15a, which has an ellipse-like section, with the hub 12' by means of a connecting member 15b. The hub 12' has a cut portion 14 of which the width at the entrance portion 14a is equal to or larger than the width of tape locking member 15a and the width of inner portion 14b is larger than the width of entrance portion 14a but smaller than the length of tape locking member 15a.

In case of Embodiment 2, the tape 1 is easily fastened to the hub 12' as shown in FIG. 5B by inserting the tape 1 as shown in FIG. 5A and pushing the connecting member 15b. That is, when the tape locking member 15a is inserted to the cut portion 14, it is turned in the direction opposite to the direction shown by the arrowhead E in FIG. 5B.

After inserting, the tape locking member 15a is liable to turn in the direction shown by the arrowhead E because of its own resilience and, therefore, the tape is fastened in the state that it is caught between the tape locking member 15a and hub. At that time, the connecting member 15b forms a part of circumferential surface of the hub 12'.

When tension is applied to the tape 1 after fastening it in case of Embodiment 2, the tape locking member 15a is liable to turn in the direction shown by the arrowhead E in FIG. 5B in the same way as the case of Embodiment 1 and, consequently, the tape is fastened more firmly.

Figure 6:
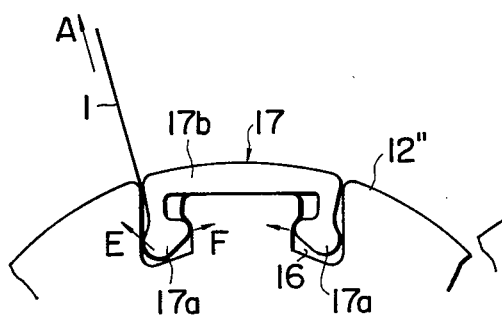
FIG. 6 shows a plan view illustrating Embodiment 3 of the present invention.

FIG. 6 shows Embodiment 3 of the cassette tape reel according to the present invention which comprises a tape locking piece 17 having tape locking members 17a at both ends of connecting member 17b. Accordingly, the cut portion 16 of hub 12" is formed as shown in FIG. 6. This cut portion is also formed so that its width at the entrance portions is equal to or larger than the width of tape locking members 17a and the width at the inner portions is larger than the width at the entrance portions but smaller than the length of tape locking members 17a.

Also in case of Embodiment 3, it is possible to push the tape locking members 17a of tape locking piece 17 into the cut portion 16 of hub 12" by very weak force, the tape locking members 17a turning at that time in the direction shown by the arrowheads F in FIG. 6 in the same way as the case of Embodiment 2. When the tape is placed on one side of cut portion 16 at that time, the tape is fastened as shown in FIG. 6 because the tape locking member 17a is liable to turn, after it is inserted to the cut portion, in the direction shown by the arrowhead E because of its own resilience. When tension is applied to the tape after it is fastened as above, the tape locking member 17a of tape locking piece 17 is liable to turn also in the direction shown by the arrowhead E and, consequently, the tape is fastened more firmly.

Figure 7:
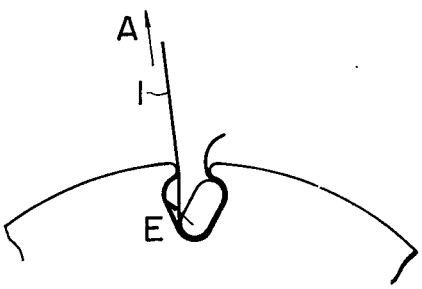
FIG. 7 shows a plan view illustrating a variation of Embodiment 1.

FIG. 7 shows a variation of Embodiment 1 shown in FIG. 4. This variation differs from Embodiment 1 in that the cut portion of hub is formed to be symmetrical in respect to a line in radial direction of hub. By arranging as above, it becomes possible to fasten the tape to the hub more efficiently because the shape of cut portion always is the same even when the hub is placed in either direction.

In the above-mentioned respective embodiments, the tape locking member has elliptic shape or ellipse-like shape. However, the shape of tape locking member is not limited to the above. It is sufficient if the length of tape locking member is larger than its width. As for the width of the entrance portion of the cut portion formed in the hub, it is possible to easily insert the tape locking member into the cut portion when the above width is made equal to or larger than the width of tape locking member. Therefore, it is preferable to make the width of the entrance portion of the cut portion larger as long as the tape locking member is reliably held in the cut portion when the former is inserted into the latter.

As explained in the above, when the tape reel according to the present invention is used, it is possible to fasten the tape to the hub quite easily. Moreover, when the tape is once fastened to the hub, the tape fastening force becomes stronger because of tension to be applied to the tape and, therefore, the tape does not come off from the hub.

Application of the cassette tape reel according to the present invention is not limited to the hubs of cassette tape reels for video tapes. It is possible to apply the present invention also to various other tape reels such as the hubs of cassette tape reels for audiotapes.

I claim:

1. A cassette tape reel comprising:
    a hub having a cut portion for fastening a tape, and
    an elongated, smooth tape locking piece having continuously rounded ends for fastening said tape in said cut portion,
    said cut portion being narrow at its entrance portion and wide at its inner portion,
    said inner portion having a maximum width which is shorter than the cross sectional length between said rounded ends of each locking piece for wedging said tape against said inner portion by said locking piece,
    said inner portion further having along a non-radial direction a maximum dimension longer than said length for inserting said locking piece into said inner portion,
    said cassette tape reel being arranged for inserting said tape locking piece into said inner portion so that its length lies along said maximum dimension and then for turning said tape locking piece in order to fasten the tape by wedging it against said inner portion by the said rounded ends of said tape locking piece, tension thereafter applied to said tape being operative to wedge the tape more firmly.

2. A cassette tape reel according to claim 1, in which the width of said tape locking piece is smaller than the width of the entrance portion of said cut portion for allowing said locking piece to pass through said entrance position.

3. A cassette tape reel comprising
    a tape locking piece, and
    a hub having a cut portion for fastening a tape,
    said cut portion being narrow at its entrance portion and wide at its inner portion,
    said tape locking piece being elongated in cross section and having a smooth periphery and continuously rounded ends with its cross sectional length and width being respectively longer and narrower than the width of said entrance portion,
    said inner portion being elongated and having a bottom and connected thereto two opposing side walls which merge at their outer ends into respective sides of said entrance portion, at least one of said side walls having a rounded undercut section adjacent its said merger with one of said entrance portion sides, the second of said side walls being disposed and shaped relative to said undercut section for wedging one said rounded end of said locking piece and tape against said second side wall while the other rounded end of said locking piece is in said rounded undercut section of said one side wall, pull of said tape outwardly at said one rounded end of said locking piece being operative to urge further wedging of said tape and one rounded end against said second side wall.

4. A cassette tape reel according to claim 1, 2 or 3 further comprising a connecting member for connecting said tape locking piece to said hub, said connecting member being arranged to form a part of the periphery of said hub when said tape locking piece is inserted into said cut portion in order to fasten the tape there being between said tape locking piece and said connecting member a connecting portion which has resilience, said tape locking piece being turned against the resilience of said connecting portion, when said tape locking piece is inserted into said cut portion, and being liable to turn in the reverse direction because of the resilience of said connecting portion after said tape locking piece is inserted into said cut portion thereby fastening the tape.

5. A cassette tape reel according to claim 1, 2 or 3 in which said tape locking piece has two tape locking members each having an ellipse-like section and a connecting member for connecting said tape locking members with each other and in which said cut portion has concave portions for inserting said two tape locking members.

6. A cassette tape reel according to claim 1, 2 or 3 in which said cut portion is formed to be symmetrical in respect to a line in radial direction of said hub.

7. A cassette tape reel according to claim 6, in which said cut portion has concave portions on both of its sides, said concave portions respectively having shapes resembling said tape locking piece.

8. A cassette tape reel according to claims 1, 2 or 3 in which a concave portion having a shape resembling said tape locking piece is formed at a part of said cut portion and which is arranged to insert said tape locking piece into said cut portion by moving said tape locking piece in the direction of its length and then to turn said tape locking piece toward said concave portion in order to fasten the tape.

9. A cassette tape reel as in claim 1, 2 or 3 wherein said locking piece has a substantially elliptic section with smoothly and continuously curved periphery.

* * * * *